United States Patent
Tsai et al.

(10) Patent No.: US 11,949,799 B2
(45) Date of Patent: *Apr. 2, 2024

(54) I/O CIRCUIT DESIGN FOR SRAM-BASED PUF GENERATORS

(71) Applicant: Taiwan Semiconductor Manufacturing Co., Ltd., Hsin-Chu (TW)

(72) Inventors: Jui-Che Tsai, Tainan (TW); Shih-Lien Linus Lu, Hsinchu (TW); Cheng Hung Lee, Hsinchu (TW); Chia-En Huang, Hsinchu County (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 56 days.

This patent is subject to a terminal disclaimer.

(21) Appl. No.: 17/222,806

(22) Filed: Apr. 5, 2021

(65) Prior Publication Data
US 2021/0226806 A1     Jul. 22, 2021

Related U.S. Application Data

(63) Continuation of application No. 16/383,383, filed on Apr. 12, 2019, now Pat. No. 10,972,292.

(60) Provisional application No. 62/752,929, filed on Oct. 30, 2018.

(51) Int. Cl.
| | |
|---|---|
| *H04L 9/32* | (2006.01) |
| *G11C 7/06* | (2006.01) |
| *G11C 11/4091* | (2006.01) |
| *H04L 9/08* | (2006.01) |

(52) U.S. Cl.
CPC ............. *H04L 9/3278* (2013.01); *G11C 7/06* (2013.01); *G11C 11/4091* (2013.01); *H04L 9/0861* (2013.01)

(58) Field of Classification Search
CPC .............. H04L 9/3278; H04L 9/0861; H04L 2209/122; H04L 9/0866; G11C 7/06; G11C 11/4091; G11C 7/24; G11C 11/419; G11C 11/417; G11C 29/02; G11C 2029/4402;
(Continued)

(56) References Cited

U.S. PATENT DOCUMENTS

| | | | |
|---|---|---|---|
| 9,279,850 B1 * | 3/2016 | Pedersen | G01R 27/2605 |
| 2014/0185795 A1 * | 7/2014 | Gotze | G06F 21/44 380/44 |
| 2017/0038807 A1 * | 2/2017 | Bittlestone | G06F 21/73 |

* cited by examiner

*Primary Examiner* — Abiy Getachew
(74) *Attorney, Agent, or Firm* — Duane Morris LLP

(57) ABSTRACT

Disclosed is an input/output circuit for a physical unclonable function generator circuit. In one embodiment, a physical unclonable function (PUF) generator includes: a PUF cell array comprising a plurality of bit cells configured in a plurality of columns and at least one row, and at least one input/output (I/O) circuit each coupled to at least two neighboring columns of the PUF cell array, wherein the at least one I/O circuit each comprises a sense amplifier (SA) with no cross-coupled pair of transistors, wherein the SA comprises two cross-coupled inverters with no access transistor and a SA enable transistor, and wherein the at least one I/O circuit each is configured to access and determine logical states of at least two bit cells in the at least two neighboring columns; and based on the determined logical states of the plurality of bit cells, to generate a PUF signature.

20 Claims, 10 Drawing Sheets

(58) Field of Classification Search
CPC ............ G11C 2029/5002; G11C 29/50; G11C 11/413; G11C 11/406
See application file for complete search history.

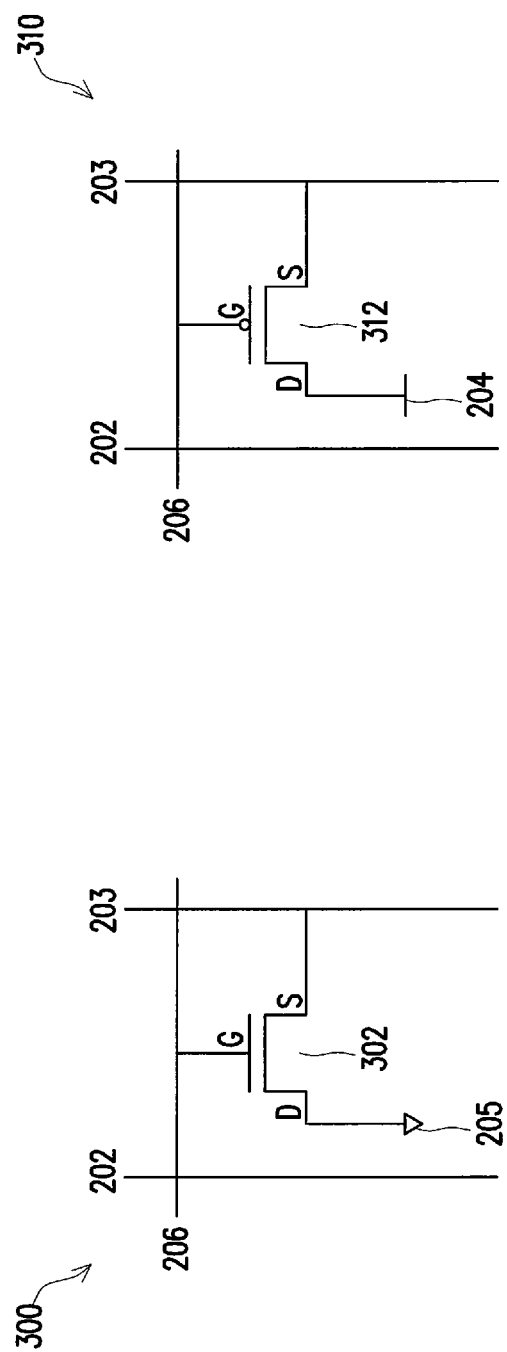

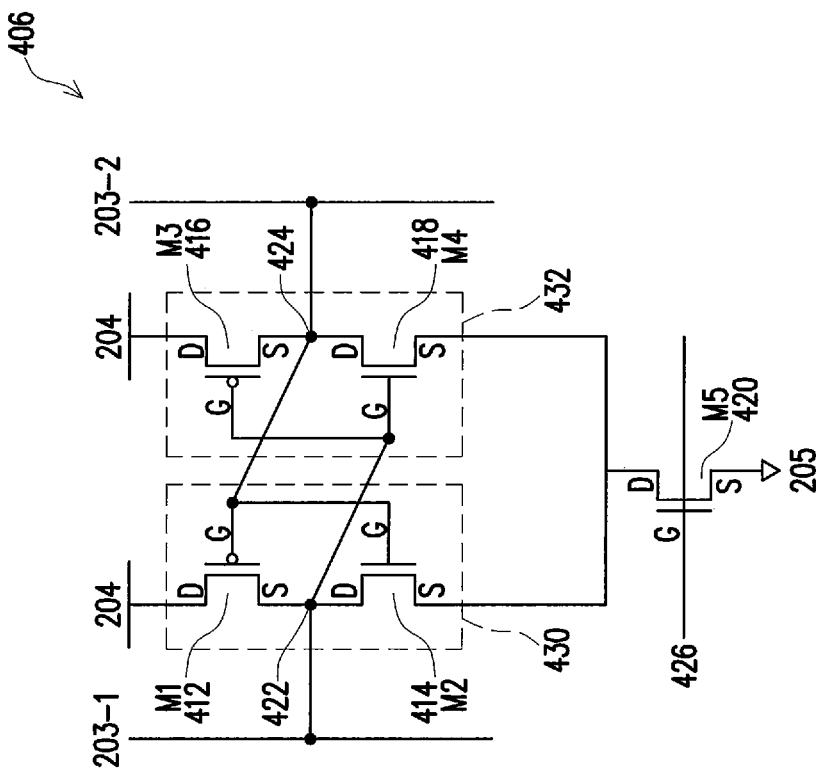
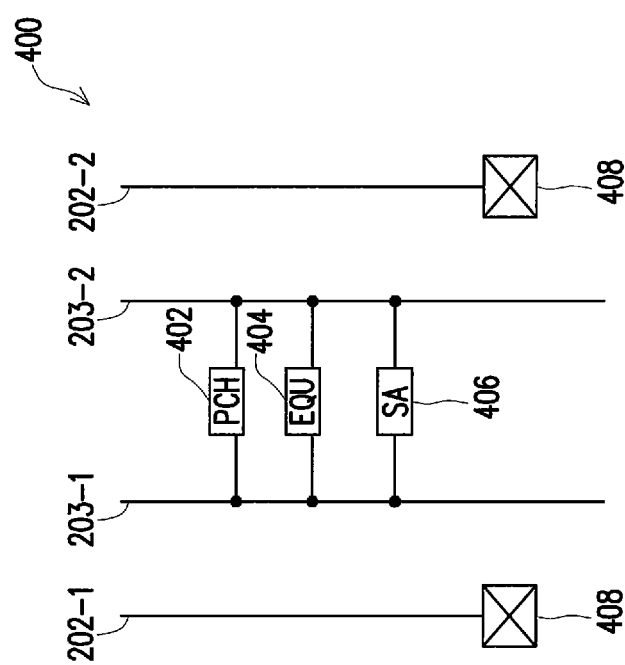
FIG. 4B
FIG. 4A

I/O CIRCUIT DESIGN FOR SRAM-BASED PUF GENERATORS

This application is a continuation application of U.S. patent application Ser. No. 16/383,383, filed Apr. 12, 2019, which claims the benefit of priority to U.S. Provisional Patent Application No. 62/752,929, filed Oct. 30, 2018, the content of which is incorporated herein.

BACKGROUND

A physically unclonable function (PUF) generator is a physical structure generally within an integrated circuit that provides a number of corresponding outputs (e.g., responses) in response to inputs (e.g., challenges) to the PUF generator. A unique identity of the integrated circuit may be established by such challenge-response pairs provided by the PUF generator. With the establishment of the identity, secure communication can be guaranteed.

Manufacturing processes can cause variations in physical dimensions and/or may cause variations in material properties, which lead to different electrical properties between devices, although devices are designed to be exactly the same and manufactured from the same manufacturing process. These variations in devices can be used to generate unique and stable PUF responses. Ideally, a PUF generator contains bit cells that can provide stable responses independent of challenge conditions (e.g., temperature, noise, etc.). However, instability can be introduced to a PUF response from other associated circuits, e.g., an input/output (I/O) circuit. To improve the number of stable bit cells and overall stability of a PUF generator, there exists a need to develop a new I/O circuit that does not introduce instability to a PUF generator.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

FIG. 3A illustrates an exemplary circuit diagram of a bit cell, in accordance with some embodiments of the present disclosure.

FIG. 3B illustrates an exemplary circuit diagram of a bit cell, in accordance with some embodiments of the present disclosure.

FIG. 4A illustrates an exemplary input/output (I/O) circuit for two neighboring columns of a PUF cell array, in accordance with some embodiments of the present disclosure.

FIG. 4B illustrates an exemplary sense amplifier (SA) circuit for two neighboring columns of a PUF cell array, in accordance with some embodiments of the present disclosure.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

It is understood that even though each of the bit cells in a PUF cell array and even each of the devices within the same bit cell are manufactured using the same process, one or more manufacturing variabilities may still cause each bit cell of the PUF cell array to be unique due to an intrinsic tendency of the bit cell while the bit cell is accessed. For example, each bit cell may have an intrinsic tendency to present either a logic "1" or a logic "0", and moreover, some bit cells may have a strong intrinsic tendency (known as "stable" bit cells) and some bit cells may have a weak intrinsic tendency (known as "unstable" bit cells). The disclosure presents an input/output (I/O) circuit that does not affect the stability of the bit cells.

Figure 1:
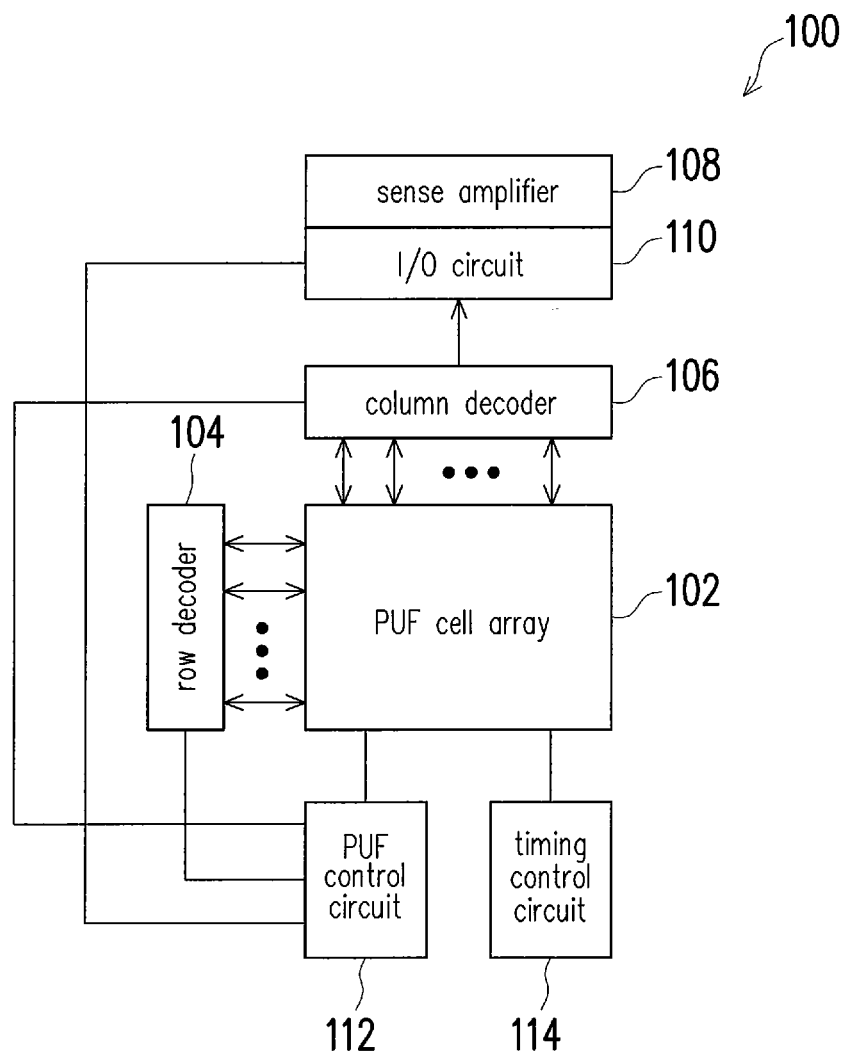
FIG. 1 illustrates an exemplary block diagram of a PUF generator, in accordance with some embodiments of present disclosure.

FIG. 1 illustrates an exemplary block diagram of a PUF generator 100, in accordance with some embodiments of present disclosure. It is noted that the PUF generator 100 is merely an example, and is not intended to limit the present disclosure. Accordingly, it is understood that additional functional blocks may be provided in or coupled to the PUF generator 100 of FIG. 1, and that some other functional blocks may only be briefly described herein.

In the illustrated embodiment of FIG. 1, the PUF generator 100 comprises a PUF cell array 102, a row decoder 104, and a column decoder 106. The row decoder 104 and column decoder 106 are coupled to a plurality of bit cells in the PUF cell array 102. The PUF generator 100 further comprises a sense amplifier (SA) 108, an input/output (I/O) circuit 110, a PUF control circuit 112 and a timing control circuit 114, in the illustrated embodiment. All the components may be coupled to each other and further to the PUF control circuit 112 and timing control circuit 114. The PUF control circuit 112 is configured to receive a request/challenge through the I/O circuit 110 (e.g., a request to power on the coupled PUF cell array 102, a request to access the PUF signature of the PUF cell array 102, to pre-charge or pre-discharge bit cells to write logical states, etc.). In some embodiments, the PUF control circuit 112 is configured to transmit a response based on the logical states of the bit cells of the PUF cell array 102 through the I/O circuit 110 (e.g., a PUF output) in response to the request. In some embodiments, such I/O circuit 110 may be directly coupled to the PUF control circuit 112. The PUF control circuit 112 is configured to control (e.g., increase or decrease) a voltage level of a supply voltage applied at each of the bit cells, control (e.g., increase or decrease) a voltage level applied at each WL coupled to the row decoder 104, as discussed in further detail below. In some embodiments, the PUF control circuit 112 may enable the voltage supply to at least one selected column and at least one selected row. In some alternative embodiments, the PUF control circuit 112 may be implemented as a separate block, which is not embedded in the PUF cell array 102. In some embodiments, the PUF control circuit 112 can be embedded in the PUF cell array 102. In some embodiments, the timing control circuit 114 provide control and synchronization on pulse signals during read and write processes. In some embodiments, the PUF control circuit 112 and timing control circuit 114 may be coupled to a common data bus for inter-communication.

The PUF cell array 102 includes a plurality of bit cells that are arranged in a column-row configuration in which each column has a bit line (BL) and a bit line bar (BLB), and each row has a word line (WL). More specifically, the BL and BLB of each column are respectively coupled to a plurality of bit cells that are disposed in that column, and each memory cell in that column is arranged on a different row and coupled to a respective (different) WL and a respective (different) WLB. That is, each bit cell of the PUF cell array 102 is coupled to a BL of a column of the PUF cell array 102, a BLB of the column of the PUF cell array 102, and a WL of a row of the PUF cell array 102. In some embodiments, the BL's and BLB's are arranged in parallel vertically and the WL's are arranged in parallel horizontally (i.e., perpendicular to the BL's and BLB's). In some embodiments, the WL for each row of bit cells in the PUF cell array 102 are connected together. In some embodiments, as discussed in further detail below with respect to FIGS. 2 and 4, the PUF cell array 102 can further include a PUF output, and a PUF output bar for each row of bit cells. In some other embodiments, the PUF cell array 102 can further include an enable line (EN) and a pre-discharge line (PD). An illustrated embodiment of the PUF cell array 102 will be provided in further detail below with reference to FIG. 2.

Each of the bit cells of the PUF cell array 102 comprises at least one transistor. In some embodiment, the bit cells each comprises 1 transistor (herein after "1T-SRAM bit cell"), which will be described in further detail below with reference to FIGS. 3A-3B. In some embodiments, the bit cell of the PUF cell array 102 each comprises 6 transistors (hereinafter "6T-SRAM bit cell"), which is described in further detail below with reference to FIG. 6.

The row decoder 104 is configured to receive a row address of the PUF cell array 102 from the PUF control circuit 112 and apply a WL at that row address. In some embodiments, the column decoder 106 may be optional. The column decoder 106 is configured to receive a column address of the PUF cell array 102 from the PUF control circuit 112 and apply a BL and/or BLB at that column address. The I/O circuit 110 are configured to access a logical state (i.e., a logical "1" or a logical "0") at each of the bit cells in the PUF cell array 102. In some embodiments, a logical state of a bit cell may be written to or read from a bit cell by the I/O circuit 110. As described above, in some embodiments, the PUF control circuit 112 is coupled to all the components and configured to control the coupled components.

Figure 2A:
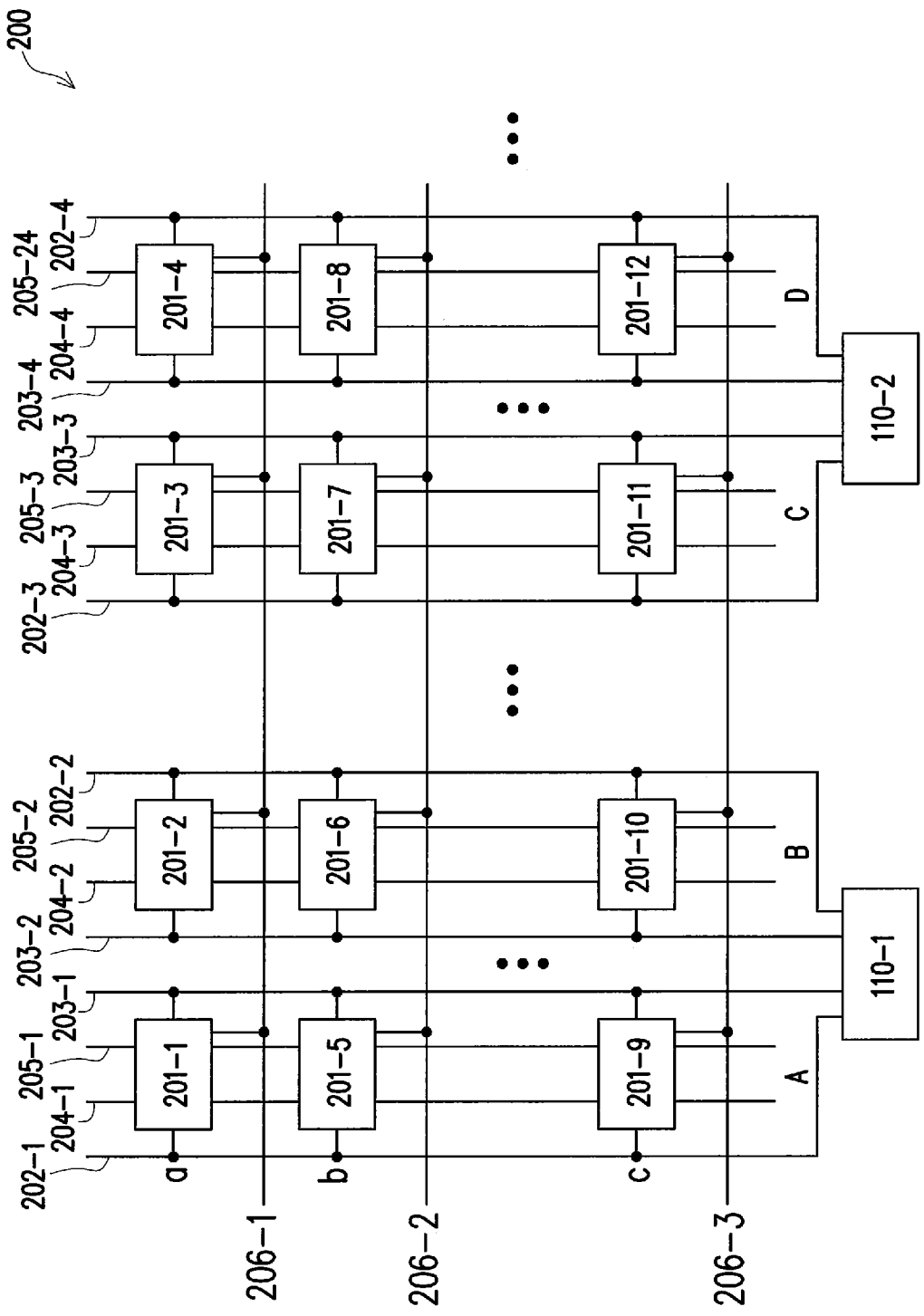
FIG. 2A illustrates an exemplary circuit diagram of a PUF cell array comprising a plurality of bit cells, in accordance with some embodiments of present disclosure.

FIG. 2A illustrates an exemplary circuit diagram of a PUF cell array 102 comprising a plurality of bit cells, in accordance with some embodiments of present disclosure. In some embodiments, the PUF cell array 102 includes a plurality of bit cells 201-1, 201-2, 201-3, 201-4, 201-5, 201-6, 201-7, 201-8, 201-9, 201-10, 201-11, and up to 201-12. Although only 12 bit cells are shown, any desired number of bit cells may be included in the PUF cell array 102 while remaining within the scope of the present disclosure. As described above, the bit cells 201-1, 201-2, 201-3, 201-4, 201-5, 201-6, 201-7, 201-8, 201-9, 201-10, 201-11, and 201-12 are arranged in a column-row configuration. More specifically, in some embodiments, the PUF cell array 102 includes bit lines (BL's) 202-1, 202-2, 202-3 and 202-4 arranged in parallel, bit line bars (BLB's) 203-1, 203-2, 203-3 and 203-4 also arranged in parallel, and word lines (WL's) 206-1, 206-2, and 206-3. The WL's 206 are arranged in parallel orthogonally to the BL's 202 and BLB's 203. In some embodiments, the PUF cell array 102 also includes positive supply voltage power (VDD) 204-1, 204-2, 204-3 and 204-4, and zero voltage reference (GND) 205-1, 205-2, 205-3 and 205-4. As such, the PUF cell array 102 may include a first plurality of columns (e.g., arranged vertically), a second plurality of rows (e.g., arranged horizontally), wherein each column includes a respective pair of BL 202, BLB 203, VDD 204, GND 205, and each row includes a respective WL 206. In the illustrated embodiments, the 12 bit cells 201 in the PUF cell array 102 each may also provide corresponding PUF outputs directly through corresponding BL 202 and BLB 203. In some embodiments, the corresponding BL 202 and BLB 203 of a column are coupled to an I/O circuit 110 together with BL 202 and BLB 203 of one of its two neighboring columns. In some other embodiments, an IO circuit 110 can be coupled to BL 202 and BLB 203 of more than 2 columns, which is further discussed in detail in FIG. 9.

Specifically, as shown in the illustrated embodiment of FIG. 2, the PUF cell array 102 includes columns "A," "B," "C," and "D," and rows "a," "b," and "c," wherein column A includes respective BL 202-1, BLB 203-1, VDD 204-1, and GND 205-1; column B includes respective BL 202-2, BLB 203-2, VDD 204-2, and GND 205-2; column C includes respective BL 202-3, BLB 203-3, VDD 204-3, and GND 205-3; and column D includes respective BL 202-4, BLB 203-4, VDD 204-4 and GND 205-4. Furthermore, row a includes a respective WL 206-1; row b includes a respective WL 206-2; and row c includes a respective WL 206-3.

Moreover, each column includes one or more bit cells that are each coupled to the column's respective BL and BLB, a different separate WL. For example, column A includes bit cells 201-1, 201-5, and 201-9, wherein the bit cells 201-1, 201-5, and 201-9 are each coupled to the BL 202-1, BLB 203-1, VDD 204-1, GND 205-1, WL's 206-1, 206-2, and 206-3, respectively; column B includes bit cells 201-2, 201-6, and 201-10, wherein the bit cells 201-2, 201-6, and 201-10 are each coupled to the BL 202-2, BLB 203-2, VDD 204-2, GND 205-2, WL's 206-1, 206-2, and 206-3, respectively; and column C includes bit cells 201-3, 201-7, and 200-11, wherein the bit cells 201-3, 201-7, and 201-11 are each coupled to the BL 202-3, BLB 203-3, VDD 204-3, GND 205-3, WL's 206-1, 206-2, and 206-3, respectively; and column D includes bit cells 201-4, 201-8, and 201-12, wherein the bit cells 201-4, 201-8, and 201-12 are each coupled to the BL 202-4, BLB 203-4, VDD 204-4, GND 205-4, WL's 206-1, 206-2, and 206-3, respectively;

As described above, each bit cell 201 of the PUF cell array 102 (e.g., 201-1, 201-2, 201-3, 201-4, 201-5, 201-6, 201-7, 201-8, 201-9, 201-10, 201-11, 201-12, etc.) may include a plurality of transistors (e.g., 6T). In some embodiments, a logical state stored in one bit cell 201 may be written to the bit cell 201 by applying either a high state (i.e., a logical "1") or a low state (i.e., a logical "0") through a corresponding BL, BLB, and WL. In some embodiments, a stable logical state of a bit cell can be achieved after stabilizing from a metastable logical state due to intrinsic differences in the bit cell (e.g., intrinsic strength differences between back-to-back coupled inverters in SRAM based bit cells). It should be also noted that FIG. 2 is only an example for illustration purposes and is not intended to be limiting. The type of signal lines in a PUF cell array 102 in in this present disclosure can be arranged in different ways depending on the circuit layout design and types of bit cells used in the array.

In the illustrated embodiment, BL 202-1 and BLB 203-1 of column A, and BLB 202-2 and BLB 203-2 of column B are coupled to a first I/O circuit 110-1; and BL 202-3 and BLB 203-3 of column C, and BL 202-4 and BLB 203-4 of column D are coupled to a second I/O circuit 110-2. In some embodiments, BL 202/BLB 203 coupled to the I/O circuit each is coupled to at least one of the following: a pre-charge or pre-discharge unit, an equalizer circuit, and a bit line pass gate (BLPG), which are discussed in further detail below in reference to FIGS. 4 and 7.

Figure 2B:
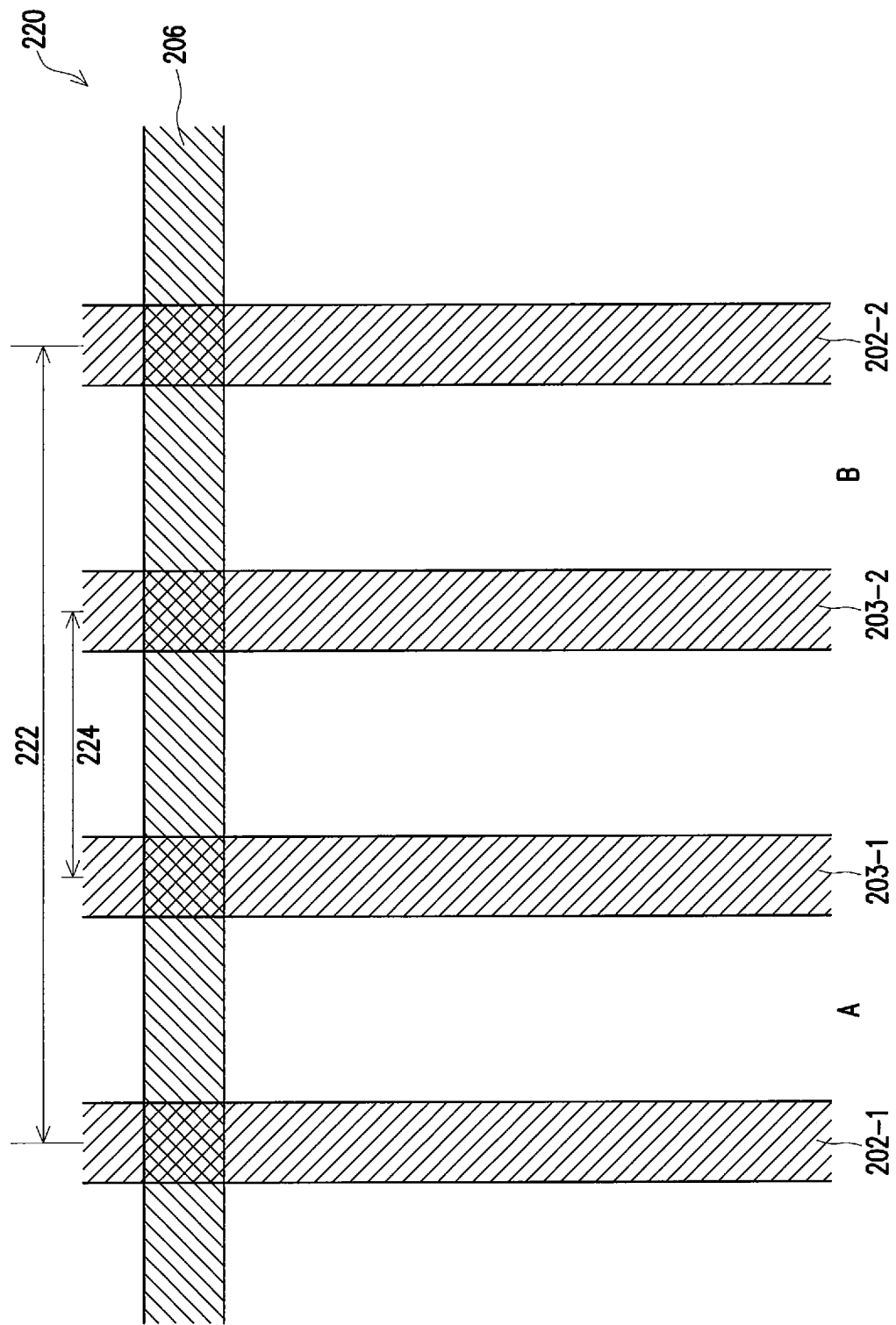
FIG. 2B illustrates a circuit layout of two neighboring columns of a PUF cell array, in accordance with some embodiments of the present disclosure.

FIG. 2B illustrates a circuit layout 220 of two neighboring columns in a PUF cell array 200, in accordance with some embodiments of the present disclosure. In the illustrated embodiment, the two neighboring columns each comprises a BL 202 and a BLB 203. Specifically, column A comprises a BL 202-1 and a BLB 203-1; and column B comprises a BL 202-2 and a BLB 203-2. In the illustrated embodiments, a first distance between the BLBs 203 in a circuit layout is smaller than a second distance between the BLs 202 of the two neighboring columns that are coupled to one SA 406. When a bit cell 201 is symmetrically configured between the corresponding BL 202 and BLB 203, the two lines from two adjacent columns that are closer in the circuit layout 220 are used to couple to the SA 406 to minimize the difference between the voltages applied on the two access transistors coupled to the BL/BLB in the 2 adjacent bit cells. In some embodiments, the voltage loss is caused by the resistance loss on a WL 206, i.e., resistance loss on a WL 206 with a length of 224 is smaller than the resistance loss on the WL with a length of 226. This method can reduce the voltage difference applied on access transistors and time delay when logical states are read from adjacent columns in a bit cell array FIG. 3A illustrates an exemplary circuit diagram of a bit cell 300, in accordance with some embodiments of the present disclosure. The bit cell 300 comprises a transistor 302. In some embodiments, drain terminal of the transistor 302 is coupled to GND 205; gate terminal of the transistor 302 is coupled to WL 206, and source terminal of the transistor 302 is coupled to BLB 203. It should be noted that the source terminal of the transistor 302 can be coupled to BL 202, which is within the scope of this invention. In some embodiments, the bit cell 300 is a pre-charge bit cell. In some embodiments, the transistor 302 of the bit cell 300 includes an NMOS transistor. Although the illustrated embodiments of FIG. 3A shows that transistor 302 is an NMOS transistor, any of a variety of transistors or devices that are suitable for use in a memory device may be implemented such as, for example, a bipolar junction transistor (BJT), a high-electron mobility transistor (HEMT), etc.

During writing, BLB 203 is first pre-charged to VDD through a pre-charge unit of the I/O circuit, when the transistors 302 of bit cells in a column is turned off by pulling down the voltage on the WL 206 to GND. In some embodiments, voltage levels on two BLBs 203 of two neighboring columns can be further equalized by an equalizer circuit of the I/O circuit 110. During reading, the transistors 302 of the bit cells in a row is turned on by pulling up the voltage on the WL 206 to a voltage above the threshold voltage of the transistors 302. The voltage level (i.e., VDD) on BLB 203 starts to discharge through the transistor 302 to GND. The discharge rates between two transistors in two neighboring cells in a row are different caused by intrinsic variations, non-uniformity in manufacturing processes, for example such as etching, photolithography, and film deposition, can cause variations in physical dimensions such as gate thickness, contact thickness, channel width, and length in transistors, and a doping concentration profile in a channel can be introduced due to a random dopant fluctuation. The difference in discharge rate causes a difference in voltage levels on the two neighboring BLBs 203 at a given time, which can be then amplified by the SA to obtain a stable logical state based on two neighboring bit cells.

FIG. 3B illustrates an exemplary circuit diagram of a bit cell 310, in accordance with some embodiments of the present disclosure. The bit cell 310 comprises a transistor 312. In some embodiments, drain terminal of the transistor 312 is coupled to VDD 204; gate terminal of the transistor 312 is coupled to WL 206, and source terminal of the transistor 312 is coupled to BLB 203. It should be noted that the source terminal of the transistor 312 can be coupled to BL 202, which is within the scope of this invention. In some embodiments, the bit cell 310 is a pre-discharge bit cell. In some embodiments, the transistor 312 of the bit cell 310 includes a PMOS transistor. Although the illustrated embodiments of FIG. 3A shows that transistor 312 is a PMOS transistor, any of a variety of transistors or devices that are suitable for use in a memory device may be implemented such as, for example, a bipolar junction transistor (BJT), a high-electron mobility transistor (HEMT), etc.

During writing, BLB 203 is first pre-discharged to GND through a pre-discharge unit of the I/O circuit, when the transistors 312 of bit cells in a column is turned off by pulling up the voltage on the WL 206 to VDD. In some embodiments, voltage levels on two BLBs 203 of two neighboring columns can be further equalized by an equalizer circuit of the I/O circuit 110. During reading, the transistor 312 of a row is turned on by pulling up the voltage on the WL 206 to a voltage below the threshold voltage of the transistor 312. The voltage level (i.e., GND) on the BLB 203 starts to charge through the transistor 312 to VDD. The charge rates between two transistors in two neighboring cells in a row are different caused by intrinsic variations and non-uniformity in manufacturing processes, for example such as etching, photolithography, and film deposition, can cause variations in physical dimensions such as gate thickness, contact thickness, channel width, and length in transistors, and a doping concentration profile in a channel can be introduced due to a random dopant fluctuation. The difference in charge rate causes a difference in voltage levels on the two neighboring BLBs 203 at a given time, which can be then amplified by the SA to obtain a stable logical state based on two neighboring bit cells.

FIG. 4A illustrates an exemplary input/output (I/O) circuit 400 for two neighboring columns of a PUF cell array 200, in accordance with some embodiments of the present disclosure. In some embodiments, the PUF cell array 200 comprises a plurality of pre-charge (PCH) bit cells 300. In the illustrated embodiments, the BLBs 203 of the two adjacent columns each is coupled to a PCH circuit 402 and an EQU circuit 404. If the PUF cell array 200 comprises a plurality of pre-discharge (PDCH) bit cells 310, the BLBs 203 of the two adjacent columns each is coupled to a PDCH circuit 402 and an EQU circuit 404. In some of the embodiments, since the PCH bit cell 300 is only coupled to one of the BLB 203 as illustrated in FIG. 3A, only BLB 203 that is coupled to the PCH bit cell 300 is coupled to the PCH circuit 402 and the EQU circuit 404. In some embodiments, the BLs 202 of the two neighboring columns are coupled to floating terminals 408. In the illustrated embodiments, the BLBs 203 of the neighboring columns are further coupled to a SA 406, which is discussed in further detail in FIG. 4B.

In some embodiments, the PCH circuit 402 comprises at least one transistor which pulls the voltage level on the corresponding BL 202 or BLB 203 to VDD after being turned on. In some embodiments, the PDCH circuit 402 may also comprise at least one transistor which pulls the voltage level on the corresponding BL 202 or BLB 203 to GND after being turned on. In some embodiments, the EQU circuit 404 comprises at least one transistor which equalizes the voltage levels on the BLs 202 or the BLB 203 when being turned on.

In some embodiments, the PCH 402, the EQU 404 and the SA 406 are directly coupled to the corresponding BL 202 and/or BLB 203 without using any bit line pass gate (BLPG) in between so as to maintain the difference in voltage levels (i.e., reduce the voltage degradation when being read to the SA 406) so as to maintain the stability of bit cells in the PUF cell array, especially when the bit cells in the PUF cell array each is 1-T bit cell. In some embodiments, the PCH 402, the EQU 404 and the SA 406 are coupled to the BL 202 and/or BLB 203 through BLPGs, when the bit cells of the PUF cell array is a 6-T bit cell, which is discussed in detail in FIG. 7B below. In some embodiments, the I/O circuit 400 does not comprise a cross-coupled transistor pair. In some embodiments, the cross-coupled transistor pair comprises 2 cross-coupled PMOS transistors.

FIG. 4B illustrates an exemplary sense amplifier (SA) circuit 406 for two neighboring columns of a PUF cell array 200, in accordance with some embodiments of the present disclosure. In some embodiments, the SA 406 comprises 5 transistors, M1 412, M2 414, M3 416, M4 418 and M5 420. In some embodiments, the transistor M5 420 is a SA enable transistor. In some embodiments, there are a plurality of SA enable transistors 420. In the illustrated embodiments, the SA enable transistor 420 is further coupled to ground.

In some embodiments, the transistors M1 412 and M2 414 are formed as a first inverter 430 on the left and the transistors M3 416 and M4 418 are formed as a second inverter 432 on the right. In some embodiments, the first inverter 430 and the second inverter 432 are cross-coupled to each other. More specifically, source terminal of the transistor M1 412 is coupled with drain terminal of the transistor M2 414 at a first node 422. Similarly, source terminal of the transistor M3 416 is coupled with drain terminal of the transistor M4 418 at a second node 424. Gate terminals of the transistors M1 412 and M2 414 are coupled together and further to the second node 424, while gate terminals of the transistors M3 416 and M4 418 are coupled together and further to the first node 422. Drain terminals of transistors M1 412 and M3 416 are coupled to VDD and source terminals of transistors M2 414 and M4 418 are coupled to drain terminal of the SAEN transistor 420. In some embodiments, source terminal of the SAEN transistor 420 is coupled to GND and gate terminal of the SAEN transistor 420 is coupled to SAEN line 426. In some embodiments, the first node 422 and the second node 424 are coupled to BLB 203-1 and BLB 203-2 of two corresponding columns, respectively.

In some embodiments, the transistors M2 414, M4 418 and M5 420 each includes an NMOS transistor, and the transistors M1 412 and M3 416 each includes a PMOS transistor. Although the illustrated embodiments of FIG. 4B shows that transistors M1-M5 are either NMOS or PMOS transistors, any of a variety of transistors or devices that are suitable for use in a memory device may be implemented as at least one of transistors M1-M5 such as, for example, a bipolar junction transistor (BJT), a high-electron mobility transistor (HEMT), etc. In some embodiments, the SA 406 does not comprise access transistors between the BLB 203-1 and 203-2 and the two cross-coupled inverters 430 and 432 in order to reduce the voltage degradation when going through these access transistors before the voltage difference is amplified by the SA 406 so as to maintain the stability of PUF responses.

Figure 4D:
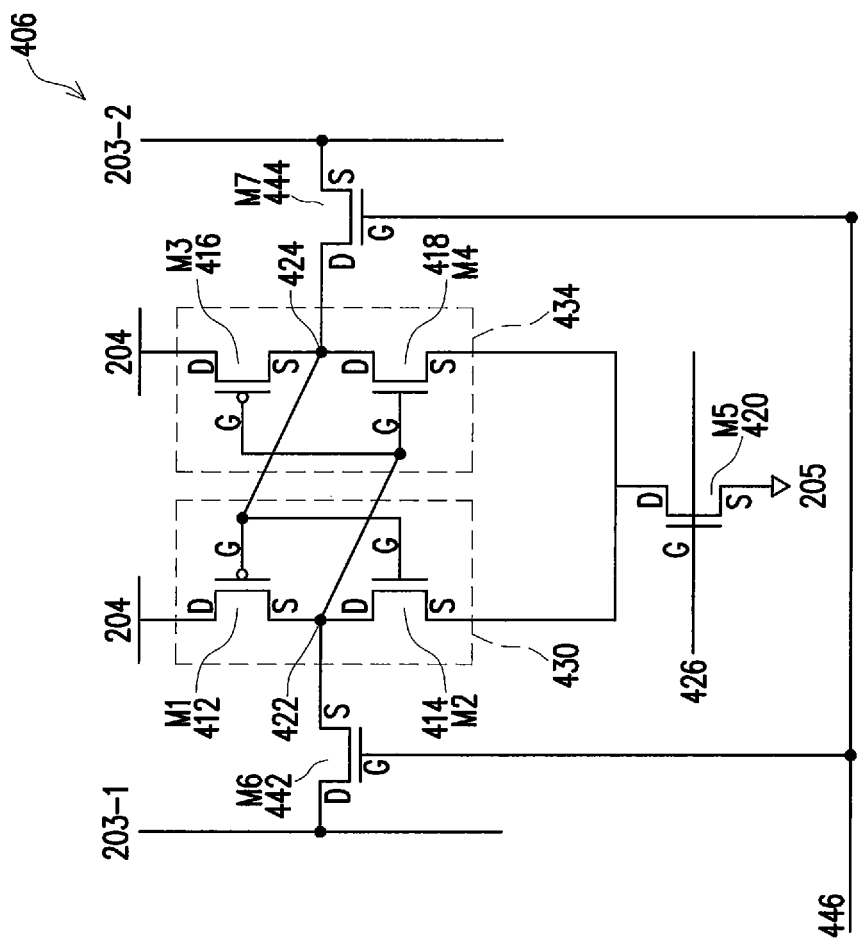
FIG. 4D illustrates an exemplary sense amplifier (SA) circuit for two neighboring columns of a PUF cell array, in accordance with some embodiments of the present disclosure.
Figure 4C:
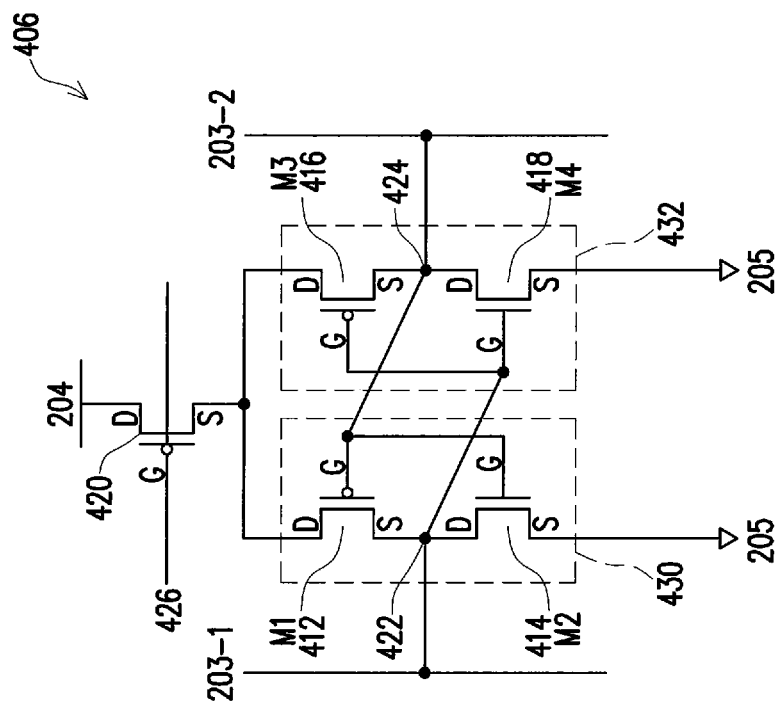
FIG. 4C illustrates an exemplary sense amplifier (SA) circuit for two neighboring columns of a PUF cell array, in accordance with some embodiments of the present disclosure.

FIG. 4C illustrates an exemplary sense amplifier (SA) circuit 406 for two neighboring columns of a PUF cell array 200, in accordance with some embodiments of the present disclosure. In some embodiments, the SA 406 comprises 5 transistors, M1 412, M2 414, M3 416, M4 418 and M5 420. In some embodiments, the transistor M5 420 is a SA enable (SAEN) transistor. In some embodiments, there are a plurality of SAEN transistors 420. In the illustrated embodiments, the SAEN 420 is further coupled to ground.

In some embodiments, the transistors M1 412 and M2 414 are formed as a first inverter 430 on the left and the transistors M3 416 and M4 418 are formed as a second inverter 432 on the right. In some embodiments, the first inverter 430 and the second inverter 432 are cross-coupled to each other. More specifically, source terminal of the transistor M1 412 is coupled with drain terminal of the transistor M2 414 at a first node 422. Similarly, source terminal of the transistor M3 416 is coupled with drain terminal of the transistor M4 418 at a second node 424. Gate terminals of the transistors M1 412 and M2 414 are coupled together and further to the second node 424, while gate terminals of the transistors M3 416 and M4 418 are coupled together and further to the first node 422. Drain terminals of transistors M1 412 and M3 416 are coupled to source terminal of the SAEN transistor 420 and source terminals of transistors M2 414 and M4 418 are coupled to GND. In some embodiments, drain terminal of the SAEN transistor 420 is coupled to VDD 204 and gate terminal of the SAEN transistor 420 is coupled to SAEN line 426. In some embodiments, the first node 422 and the second node 424 are coupled to BLB 203-1 and BLB 203-2 of two corresponding neighboring columns, respectively.

In some embodiments, the transistors M2 414, M4 418 and M5 420 each includes an NMOS transistor, and the transistors M1 412 and M3 416 each includes a PMOS transistor. Although the illustrated embodiments of FIG. 4B shows that transistors M1-M5 are either NMOS or PMOS transistors, any of a variety of transistors or devices that are suitable for use in a memory device may be implemented as at least one of transistors M1-M5 such as, for example, a bipolar junction transistor (BJT), a high-electron mobility transistor (HEMT), etc. In some embodiments, the SA 406 does not comprise access transistors between the BLB 203-1 and 203-2 and the two cross-coupled inverters 430 and 432 in order to reduce the voltage degradation when going through these access transistors before the voltage difference is amplified by the SA 406 so as to maintain the stability of PUF responses.

FIG. 4D illustrates an exemplary SA circuit 406 for two neighboring columns of a PUF cell array 200, in accordance with some embodiments of the present disclosure. In some embodiments, the SA 406 comprises 7 transistors, M1 412, M2 414, M3 416, M4 418, M5 420, M6 442 and M7 444. In some embodiments, the transistor M5 420 is a SA enable transistor. In some embodiments, there are a plurality of SA enable transistors 420. In the illustrated embodiments, the SA enable transistor 420 is further coupled to ground. In some embodiments, M6 442 and M7 444 are data line pass gate (DLPG) transistors.

In some embodiments, the transistors M1 412 and M2 414 are formed as a first inverter 430 on the left and the transistors M3 416 and M4 418 are formed as a second inverter 432 on the right. In some embodiments, the first inverter 430 and the second inverter 432 are cross-coupled to each other. More specifically, source terminal of the transistor M1 412 is coupled with drain terminal of the transistor M2 414 at a first node 422. Similarly, source terminal of the transistor M3 416 is coupled with drain terminal of the transistor M4 418 at a second node 424. Gate terminals of the transistors M1 412 and M2 414 are coupled together and further to the second node 424, while gate terminals of the transistors M3 416 and M4 418 are coupled together and further to the first node 422. Drain terminals of transistors M1 412 and M3 416 are coupled to VDD and source terminals of transistors M2 414 and M4 418 are coupled to drain terminal of the SAEN transistor 420. In some embodiments, source terminal of the SAEN transistor 420 is coupled to GND and gate terminal of the SAEN transistor 420 is coupled to SAEN line 426. In some embodiments, the first node 422 and the second node 424 are coupled to BL 202 and BLB 203 of a corresponding column through DLPG transistors M6 442 and M7 444, respectively. Specifically, the first node is coupled to source terminal of a first DLPG transistor M6 442 and the second node is coupled to drain terminal of a second DLPG transistor M7 444. Drain terminal of the first DPG transistor M6 442 and source terminal of the second DLPG transistor M7 444 are coupled to BLB 203-1 and BLB 203-2, respectively. Gate terminals of the first and the second DLPG transistors M6 442/M7 444 are coupled together and further to a data line pass line 446.

In some embodiments, the transistors M2 414, M4 418, M5 420, M6 442 and M7 444 each includes an NMOS transistor, and the transistors M1 412 and M3 416 each includes a PMOS transistor. Although the illustrated embodiments of FIG. 4D shows that transistors M1-M7 are either NMOS or PMOS transistors, any of a variety of transistors or devices that are suitable for use in a memory device may be implemented as at least one of transistors M1-M5 such as, for example, a bipolar junction transistor (BJT), a high-electron mobility transistor (HEMT), etc.

Figure 5:
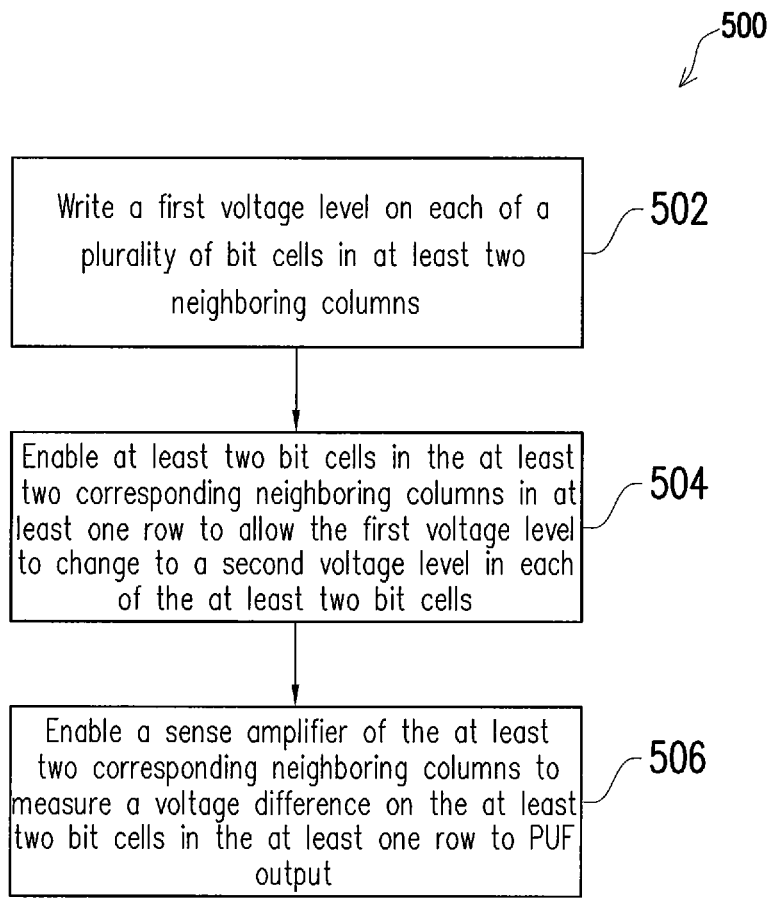
FIG. 5 illustrates a method to generate a PUF output from a PUF cell array with a plurality of bit cells using an I/O circuit, in accordance with some embodiments of the present disclosure.

FIG. 5 illustrates a method 500 to generate a PUF output from a PUF cell array 200 with a plurality of bit cells 300 using an I/O circuit 400, in accordance with some embodiments of the present disclosure. It is understood that additional operations may be provided before, during, and after the method 500 of FIG. 5, and that some operations may be omitted or reordered.

The method 500 starts with operation 502 in which a first voltage level is written on a plurality of bit cells 300 in at least two neighboring columns of a PUF cell array 200 according to some embodiments. In some embodiments, the first voltage is pre-charge voltage (e.g., VDD). In some embodiments, each bit cells 300 in two neighboring columns are pre-charged by turning on the PCH circuit 402. In some embodiments, the two first voltage levels on the two neighboring column are further equalized by an EQU circuit 404, especially, when the two bit cells in the two neighboring column in a row have different threshold voltages. In some embodiments, the plurality of bit cells 300 in two neighboring columns each comprises 1 transistors which has one terminal coupled to a BL 202 or a BLB 203. In some embodiments, the first voltage is applied on the plurality of bit cells in at least two columns through corresponding BLBs 203, wherein a first distance between the BLBs 203 is smaller than a second distance between the BLs 202 of the two corresponding columns.

The method 500 continues with operation 504 in which at least two bit cells in at least one row are enabled to allow the first voltage level to change to a second voltage level according to some embodiments. In some embodiments, when the plurality of bit cells are pre-charge bit cells 300, the at least two bit cells in the at least one row are enabled by pulling down the voltage level on corresponding WL 206. In some other embodiments, when the plurality of bit cells are pre-discharge bit cells 310, the at least two bit cells in the at least one row are enabled by pulling up the voltage level on the corresponding WL 206. In some embodiments, the PCH/PDCH circuit 402 and the EQU circuit 404 are disabled, when the transistors of two bit cells of two neighboring columns in the at least one row are enabled.

When the at least two bit cells in the at least one row are turned on, voltage levels on the BLBs 203 of the corresponding columns are changed from the first voltage to the second voltage. In some embodiments, when the plurality of bit cells are pre-charge bit cells 300, the voltage level on the BLB 203 drops from VDD-VTH to GND. In some embodiments, VTH is the threshold voltage of the transistor 302 of a bit cell. The threshold voltage (VTH) of the transistor 302 is the minimum gate-to-source voltage differential that is needed to create a conducting path between the terminals source and drain of the transistor 302. In some other embodiments, when the plurality of bit cells are pre-discharge bit cells 310, the voltage level on the BLB 203 increases from GND to VDD-VTH, wherein the VTH is the threshold voltage of the transistor 312 of a bit cell.

A difference in change rates of the voltage levels on the BLBs 203 of two bit cells in a row and two neighboring columns from the first voltage to the second voltage causes a voltage difference on the two BLBs 203 of two corresponding neighboring columns, which can be further amplified by a SA in order to obtain a PUF output. The difference in the change rates (discharge or charge rate) of two bit cells in two neighboring columns is caused by intrinsic variations, non-uniformity in manufacturing processes, for example such as etching, photolithography, and film deposition, can cause variations in physical dimensions such as gate thickness, contact thickness, channel width, and length in transistors, and a doping concentration profile in a channel can be introduced due to a random dopant fluctuation.

The method 500 continues with operation 506 in which the voltage difference on the two BLBs 203 of the two corresponding neighboring columns are measured by an sense amplifier to obtain a PUF output according to some embodiments. In some embodiments, the SA 406 is enabled by enabling at least one corresponding SAEN transistor 420. In In some embodiments, the at least one corresponding SAEN transistor 420 is coupled to two cross-coupled inverters 430 and 432. A voltage difference between the BLB 203-1 and BLB 203-2 of two neighboring columns cannot be sustained once the cross-coupled inverters 430/432 are enabled due to its particular back-to-back configuration of the two inverters. The voltage difference can be amplified by the cross-coupled inverters 430/432 and eventually generate either a logic "1" or logic "0" on the BLB 203-1/203-2. In some embodiments, the PCH/PDCH circuit 402 and the EQU circuit 404 remain off, when the SA 406 is enabled.

Figure 6:
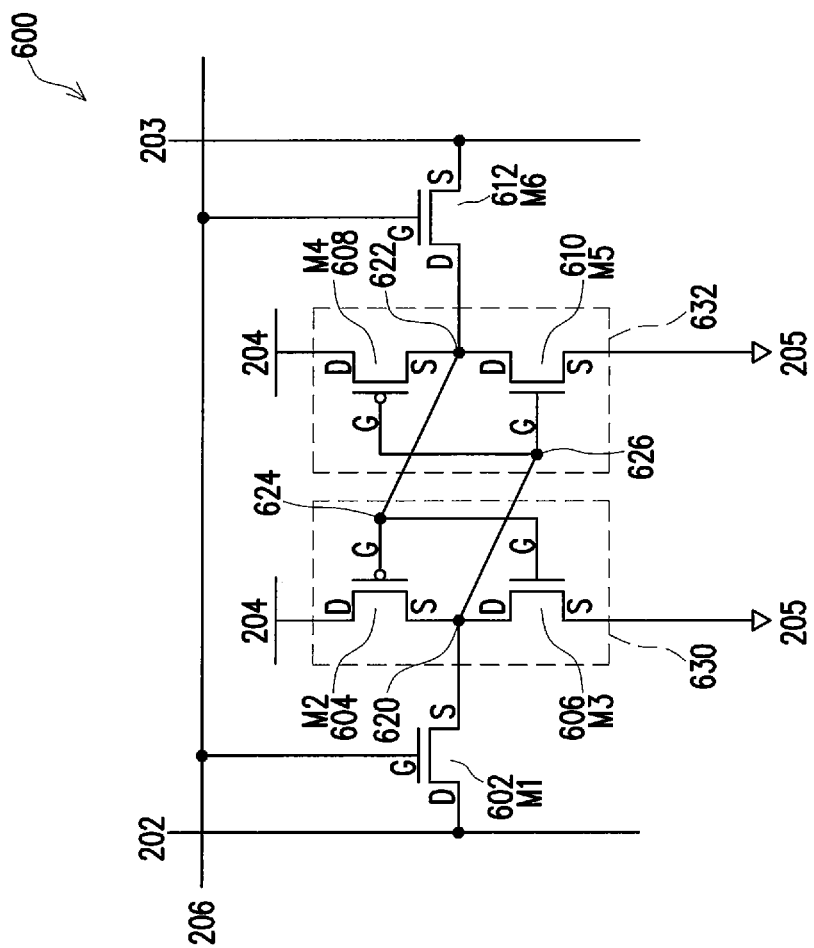
FIG. 6 illustrates an exemplary circuit diagram of a bit cell in a PUF cell array, in accordance with some embodiments of the present disclosure.

FIG. 6 illustrates an exemplary circuit diagram of a bit cell 600 in a PUF cell array 200, in accordance with some embodiments of the present disclosure. The bit cell 600 includes 6 transistors: M1 602, M2 604, M3 606, M4 608, M5 610, and M6 612. In some embodiments, the transistors M1 602 and M6 612 are access transistors. In some embodiments, the bit cell 600 also comprises enable transistors (not shown) that are coupled to the cross-coupled inverters 630/632.

In some embodiments, the transistors M2 604 and M3 606 are formed as a first inverter 630 on the left and the transistors M4 608 and M5 610 are formed as a second inverter 632 on the right wherein the first and second inverters 630/632 are cross-coupled to each other. More specifically, source terminal of the transistor M2 604 is coupled with drain terminal of the transistor M3 606 at a storage node (SN) 620. Similarly, source terminal of the transistor M4 608 is coupled with drain terminal of the transistor M5 610 at a storage node bar (SNB) 622. Gate terminals of the transistors M2 604 and M3 606 are coupled together at node 624, while gate terminals of the transistors M4 608 and M5 610 are coupled together at node 626. In some embodiments, the node 624 is coupled to the SNB 622 and the node 626 is coupled to SN 620. The SN 620 is further coupled to source terminal of the transistor M1 602 and SNB 622 is coupled to drain terminal of the transistor M6 612. Drain terminal and source terminal of the transistors M1 602 and M6 612 are further coupled with the BL 202 and BLB 203 of a column, respectively. Drain terminals of the transistors M2 604 and M4 608 are coupled to VDD 204. Source terminals of the transistors M2 606 and M5 610 are coupled to GND 205. Gate terminals of the transistors M1 602 and M6 612 are coupled to WL 206.

In some embodiments, the transistors M1 602, M3 606, M5 610 and M6 612 each includes an NMOS transistor, and the transistors M2 604 and M4 608 each includes a PMOS transistor. Although the illustrated embodiments of FIG. 6 shows that M1-M6 are either NMOS or PMOS transistors, any of a variety of transistors or devices that are suitable for use in a memory device may be implemented as at least one of M1-M6 such as, for example, a bipolar junction transistor (BJT), a high-electron mobility transistor (HEMT), etc.

During a normal operation phase to generate a PUF output, when the voltage level on the WL 206 is pulled up, the access transistors M1 602 and M2 612 are turned on. When pre-charging the bit cell 600, the BL 202 and BLB 203 are pulled up to a high voltage level (i.e., VDD) so as to store a metastable logical state "1" to each of the SN 620 and SNB 622. In some embodiments, when pre-discharging the bit cell 600, the BL 202 and BLB 203 are pulled down to a low voltage level (i.e., GND) so as to store a metastable logical state "0" to each of the SN 620 and SNB 622.

The metastable logical states previously stored on the SN/SNB 620/622 cannot be sustained once the access transistors are turned off by pulling down the voltage level on the WL 206. The cross-coupled inverters 630/632 are enabled due to its particular back-to-back configuration of the two inverters and the strength difference between the two cross-coupled inverters 630/632 caused by intrinsic process variations during fabrication. The small mismatch of strength in the cross-coupled inverters 630/632 will be eventually amplified by the positive feedback of the cross-coupled inverters 630/632 and will eventually generate either logic "1" or logic "0" on the SN 620/SNB 622. Since the design is highly symmetric and the only randomness is caused by the fabrication process of the transistors in the cross-coupled inverters, the binary output of the logical states, when the plurality of bit cells 600 are stabilized are unique, random and non-traceable. Finally, the logical states on SN 620 and SNB 622 are further inverted by the respective inverters 630/632 before read out on to the BL 202 and BLB 203 when the voltage level on the WL 206 is pulled up again, respectively.

Figures 7A, 7B:
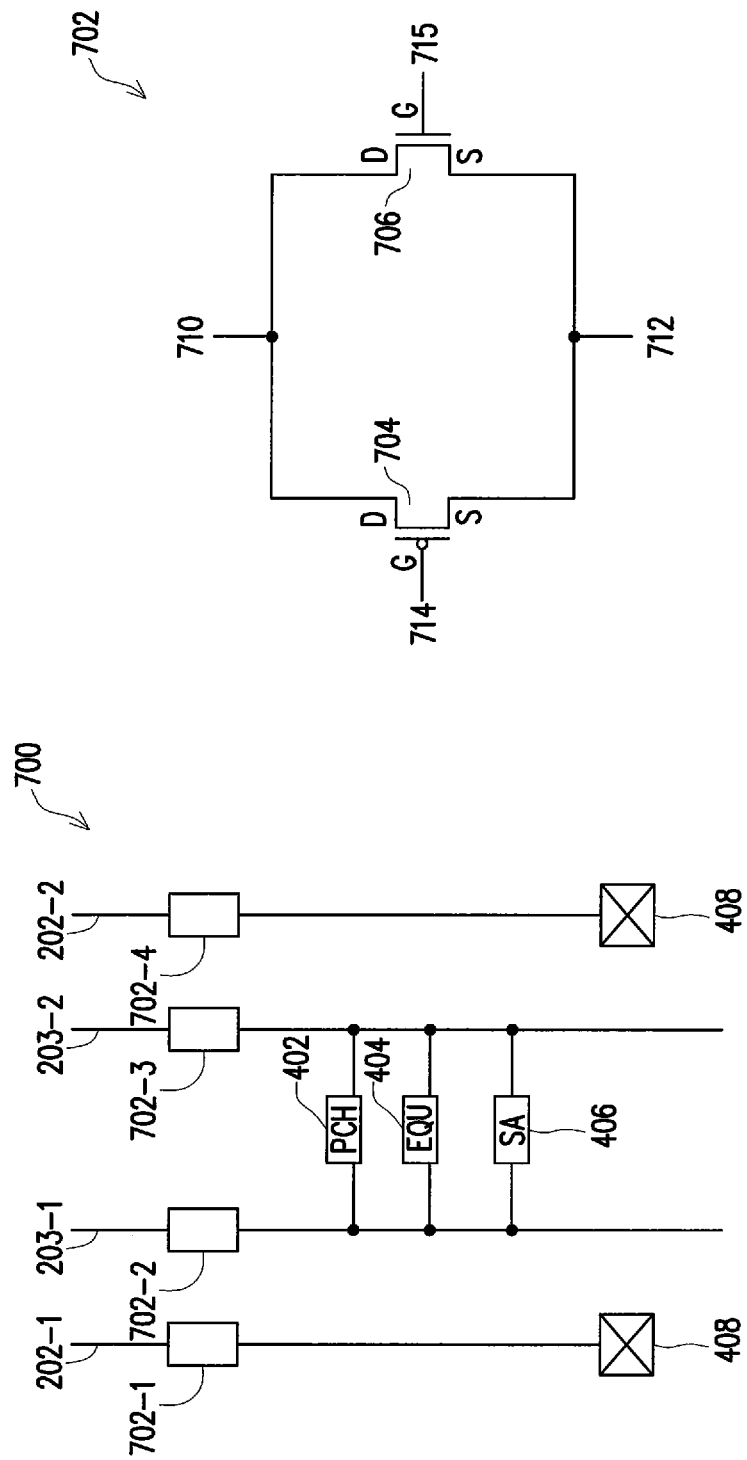
FIG. 7A illustrates an exemplary input/output (I/O) circuit for two neighboring columns of a PUF cell array, in accordance with some embodiments of the present disclosure.
FIG. 7B illustrates an exemplary circuit diagram of a bit line pass gate (BLPG) in accordance with some embodiments of the present disclosure.

FIG. 7A illustrates an exemplary input/output (I/O) circuit 700 for two neighboring columns of a PUF cell array 200, in accordance with some embodiments of the present disclosure. In some embodiments, the PUF cell array 200 comprises a plurality of bit cells 600. In the illustrated embodiments, the BLBs 203 of two adjacent columns each is coupled to a PCH circuit 402 and an EQU circuit 404. In some of the embodiments, since the bit cell 600 is symmetric in design and the BL/BLB 202/203 in the two neighboring columns that are separated by a smaller distance can be used to couple to the SA 406 of the I/O circuit 700. In some embodiments, the BLs 202 of the 2 neighboring columns are coupled to floating terminals 408.

In some embodiments, the PCH circuit 402 comprises at least one transistor which pulls the voltage level on the corresponding BL 202 and BLB 203 to VDD after being turned on. In some embodiments, the EQU circuit 404 comprises at least one transistor which equalizes the voltage levels on the BLs 202 or the BLB 203 when being turned on.

In some embodiments, the BL 202 and BLB 203 of each column each is coupled to a bit line pass gate (BLPG) 702. In some embodiments, the BLPG 702 is an ultralow threshold voltage transmission gate. In some embodiments, the BLPG 702 on each of the BL 202 and BLB 203 can provide isolation to prevent the output from the SA 406 to transmit back to the bit cells 600 in the 2 neighboring columns.

FIG. 7B illustrates an exemplary circuit diagram of a bit line pass gate (BLPG) 702 in accordance with some embodiments of the present disclosure. In the illustrated embodiments, the BLPG 702 comprises 2 transistors: a first transistor 704 and a second transistor 706. In some embodiments, the first transistor 704 is a PMOS transistor and the second 706 is a NMOS transistor. Gate terminal of the first transistor 704 is coupled to a first control line 714; gate terminal of the second transistor 706 is coupled to a second control line 716; drain terminals of the 2 transistors 704/706 are coupled together to a first terminal 710; and source terminals of the 2 transistors 704/706 are coupled together to a second terminal 712. In some embodiments, the first and second terminals 710/712 are coupled in BL 202 and BLB 203. In some embodiments, the first control line 714 is coupled to an inverter before coupled to the second control line 716. During operation, when a signal of "1" is applied on the gate terminal of the first transistor 704 and the inverted signal "0" is applied on the gate terminal of the second transistor 706, both of the transistors 704/706 is turned off. When a signal of "0" is applied on the gate terminal of the first transistor 704 and the inverted signal "1" is applied on the gate terminal of the second transistor 706, both of the transistors 704/706 is turned on, allowing the first terminal 710 to be connected to the second terminal 712, i.e., the BLPG 702 is turned on. In this case, when a "1" is applied on the first terminal 710, the signal is transmitted through the first transistor 704; and when a "0" is applied on the first terminal 710, the signal is transmitted through the second transistor 706. In some embodiments, the BLPG 702 can be used with both a pre-charge bit cell 300 and a pre-discharge bit cell 310.

Figure 8:
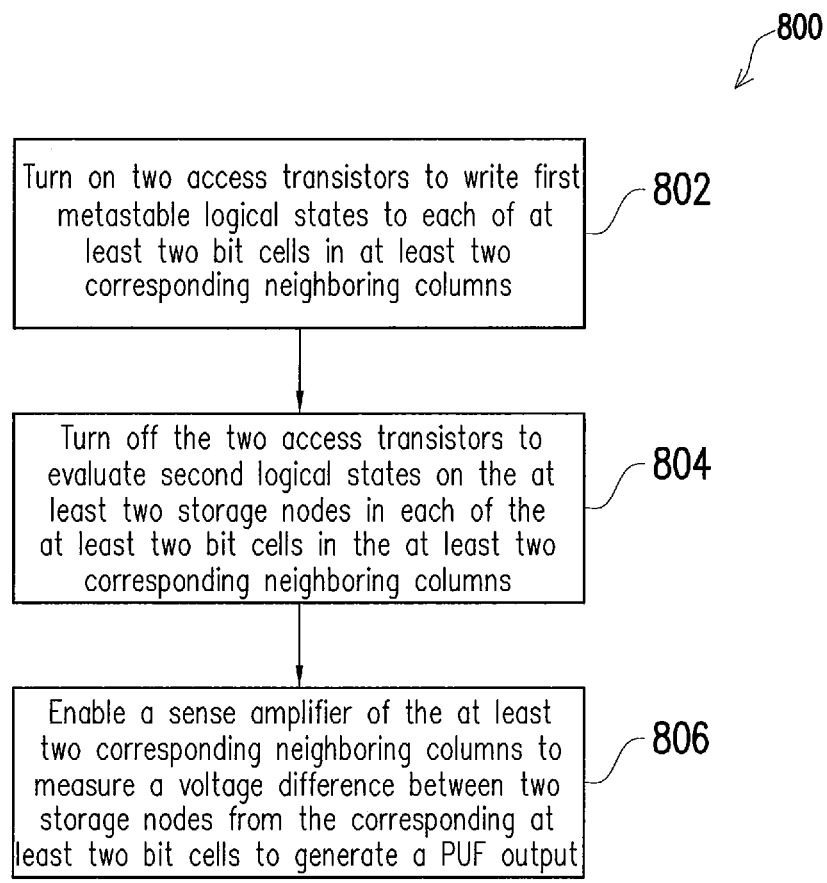
FIG. 8 illustrates a method to generate a PUF output from a PUF cell array with a plurality of bit cells using an I/O circuit, in accordance with some embodiments of the present disclosure.

FIG. 8 illustrates a method 800 to generate a PUF output from a PUF cell array 200 with a plurality of bit cells 600 using an I/O circuit 700, in accordance with some embodiments of the present disclosure. It is understood that additional operations may be provided before, during, and after the method 800 of FIG. 8, and that some operations may be omitted or reordered.

The method 800 starts with operation 802 in which two access transistors are turned on to write first metastable logical states to each of the at least two bit cells in at least two corresponding neighboring columns. In some embodiments, the voltage level on a WL 206 in a row is turned on to turn on the access transistors in each of the bit cells in the row. In some embodiments, a PCH 402 is enabled to provide a voltage level on the BL 202 and BLB 203 of each of the at least two neighboring columns. In some other embodiments, an EQU 404 is also enabled to equalize the voltage levels on the BL 202 and BLB 203 of each of the at least two neighboring columns. In some embodiments, the two storage nodes 620/622 are charged to metastable logical states, i.e., both are charged to a high level VDD or discharged to GND.

The method 800 continues with operation 804 in which the two access transistors of each of the at least two bit cells in the at least two corresponding neighboring column is turned off. In some embodiments, the two access transistors are turned off to allow the metastable logical states to stabilize to second logical states in each of the at least two bit cells in the at least two corresponding neighboring columns. In some embodiments, the PCH 402 and the EQU 404 are turned off. The metastable logical states previously stored on the SN/SNB 620/622 cannot be sustained once the access transistors are turned off by pulling down the voltage level on the WL 206. The cross-coupled inverters 630/632 are enabled due to its particular back-to-back configuration of the two inverters and the strength difference between the two cross-coupled inverters 630/632 caused by intrinsic process variations during fabrication. The small mismatch of strength in the cross-coupled inverters 630/632 will be eventually amplified by the positive feedback of the cross-coupled inverters 630/632 and will eventually generate either logic "1" or logic "0" on the SN 620/SNB 622. Since the design is highly symmetric and the only randomness is caused by the fabrication process of the transistors in the cross-coupled inverters, the binary output of the logical states, when the plurality of bit cells 600 are stabilized are unique, random and non-traceable.

The method 800 continues with operation 806 in which the sense amplifier 406 is enabled to measure a voltage difference between two voltage levels on the two corresponding storage nodes of the two bit cells in the two neighboring columns. In some embodiments, the two access transistors are turned on, while keeping the PCH 402 and EQU 404 off to read the voltage levels on the storage nodes of two bit cells to the corresponding BL 202 and BLB 203 of the corresponding columns. In some embodiments, the BLPGs 702 coupled to the BL 202 and BLB 203 are enabled to allow a proper read of voltage levels to the SA 406, while preventing back writing to the BL 202 and BLB 203 by the output of the SA 406.

In some embodiments, the SAEN 426 is pulled down to GND to turn on the SAEN transistor 420. The voltage difference on the BLB 203-1 and BLB 203-2 of the two corresponding neighboring columns is amplified by cross-coupled inverters 430/432 of the SA 406, which results in a logical states of "1" or "0" on the BLB 203-1 or BLB 203-2.

In one embodiment, a physical unclonable function (PUF) generator includes: a PUF cell array comprising a plurality of bit cells configured in a plurality of columns and at least one row, and at least one input/output (I/O) circuit each coupled to at least two neighboring columns of the PUF cell array, wherein the at least one I/O circuit each comprises a sense amplifier (SA) with no cross-coupled pair of transistors, wherein the SA comprises two cross-coupled inverters with no access transistor and a SA enable transistor, and wherein the at least one I/O circuit each is configured to access and determine logical states of at least two bit cells in the at least two neighboring columns; and based on the determined logical states of the plurality of bit cells, to generate a PUF signature.

In another embodiment, a method for generating a physical unclonable function (PUF) signature comprising: writing a first voltage in each of a plurality of bit cells in at least two neighboring columns of a PUF cell array through an input/output (I/O) circuit; stabilizing the first voltage level to a second voltage level in each of the plurality of bit cells; enabling a sense amplifier (SA) of the I/O circuit to read two second voltage levels from the at least two neighboring columns; and determining a PUF signature, wherein the I/O circuit comprises no cross-coupled pair of transistors, and wherein the SA comprises two first cross-coupled inverters with no access transistor and a SA enable transistor.

Yet, in another embodiment, a physical unclonable function (PUF) generator includes: a PUF cell array comprising a plurality of bit cells configured in a plurality of columns and at least one row, wherein the plurality of bit cells each comprises two first cross-coupled inverters and two access transistors, wherein the two access transistors are coupled to a first bit line and a second bit line of in a respective column, and a plurality of input/output (I/O) circuit each coupled to two neighboring columns of the PUF cell array, wherein the at least one I/O circuit each comprises a sense amplifier (SA) with no cross-coupled pair of transistors, wherein the SA comprises two second cross-coupled inverters with no access transistor and a SA enable transistor, and wherein each of the two second cross-coupled inverters in the SA comprises an n-type metal-oxide-semiconductor (NMOS) transistor and a p-type MOS (PMOS) transistor.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A physical unclonable function (PUF) generator comprising:
   a PUF cell array comprising a plurality of bit cells configured in a plurality of columns and at least one row, and
   at least one input/output (I/O) circuit each coupled to at least two columns of the PUF cell array, wherein the at least one I/O circuit each is configured to access and determine logical states of at least two bit cells in the at least two columns, and based on the determined logical states of the plurality of bit cells, to generate a PUF signature, wherein the at least one I/O circuit each comprises two cross-coupled inverters, wherein the two cross-coupled inverters are coupled between two first bit lines from the at least two columns of the PUF cell array.

2. The PUF generator of claim 1, wherein the two cross-coupled inverters form at least part of a sense amplifier.

3. The PUF generator of claim 2, wherein the two first bit lines are separated by a first distance, wherein the first distance is smaller than a second distance, wherein the second distance is a distance separated between two second bit lines from the at least two columns.

4. The PUF generator of claim 2, wherein each of the two cross-coupled inverters is coupled directly to the two first bit lines of the at least two columns, respectively, with no access transistor.

5. The PUF generator of claim 2, wherein the two cross-coupled inverters each comprise an n-type metal-oxide-semiconductor (NMOS) transistor and a p-type MOS (PMOS) transistor.

6. The PUF generator of claim 2, further comprising:
   at least two pass gates, wherein the at least two pass gates each is coupled between the two cross-coupled inverters and the PUF cell array, wherein the at least two pass gates each comprises a transmission gate, wherein the transmission gate comprise at least 2 transistors.

7. The PUF generator of claim 1, further comprising:
   at least one pre-discharge transistor, wherein the at least one pre-discharge transistor is coupled between a first voltage and at least one respective bit line of the at least two columns.

8. The PUF generator of claim 1, further comprising:
   at least one equalizer, wherein each of the at least one equalizer is coupled between two respective bit lines of the at least two columns.

9. The PUF generator of claim 1, wherein the plurality of bit cells each comprises a single transistor.

10. A method for generating a physical unclonable function (PUF) signature comprising:
    writing a first voltage in each of a plurality of bit cells in at least one column of a PUF cell array through an input/output (I/O) circuit;
    stabilizing the first voltage level to a second voltage level in each of the plurality of bit cells;
    enabling a sense amplifier (SA) of the I/O circuit to read the second voltage levels from the at least at least one column, wherein the SA is coupled between two first bit lines from two neighboring columns of the PUF cell array; and
    determining a PUF signature,
    wherein the I/O circuit comprises no cross-coupled pair of transistors, and wherein the SA comprises two first cross-coupled inverters.

11. The method of claim 10, wherein the writing is performed by turning on at least one pre-charge transistors, wherein the at least one pre-discharge transistor is coupled between the first voltage and at least one respective bit line of the at least one column.

12. The method of claim 10, wherein the writing further comprising:
    turning on at least two access transistors in each of the plurality of bit cells, when each of the plurality of bit cells in the PUF cell array comprises two second cross-coupled inverters.

13. The method of claim 10, wherein the stabilizing comprising:
    turning off at least two access transistors in each of the plurality of bit cells, when each of the plurality of bit cells in the PUF cell array comprises two second cross-coupled inverters.

14. The method of claim 10, wherein the two first bit lines coupled to the SA are separated by a first distance, wherein the first distance is smaller than a second distance.

15. The method of claim 14, wherein the second distance is a distance separated between two second bit lines from the at least two neighboring columns.

16. The method of claim 14, wherein each of the two first cross-coupled inverters in the SA is coupled directly to the two first bit lines of the at least two neighboring columns with no access transistor.

17. The method of claim 10, wherein the I/O circuit further comprising one of the following:
    at least two pass gates, at least one pre-discharge transistor, and at least one equalizer, wherein each of the at least two pass gates comprises a transmission gate, wherein the transmission gate comprise at least 2 transistors, wherein each of the at least one pre-discharge transistor is coupled between the first voltage and at least one respective bit line of at least two neighboring columns of the PUF cell array, wherein each of the at least one equalizers is coupled between two respective bit lines of the at least two neighboring columns.

18. A physical unclonable function (PUF) generator comprising:
    a PUF cell array comprising a plurality of bit cells configured in a plurality of columns and at least one row, wherein the plurality of bit cells each comprises two first cross-coupled inverters and two access transistors, wherein the two access transistors are coupled to a first bit line and a second bit line of a respective column, and
    a plurality of input/output (110) circuits each coupled to two columns of the PUF cell array,
    wherein the at least one I/O circuit each comprises two second cross-coupled inverters, and wherein each of the two second cross-coupled inverters comprises an n-type metal-oxide-semiconductor (NMOS) transistor and a p-type MOS (PMOS) transistor, and wherein the two second cross-coupled inverters are coupled between two first bit lines from at least two columns of the PUF cell array.

19. The PUF generator of claim 18, wherein each of the two second cross-coupled inverters is coupled directly to the two first bit lines of the two columns with no access transistor, wherein the two first bit lines are separated by a first distance, wherein the first distance is smaller than a second distance, wherein the second distance is a distance separated between two second bit lines from the two columns.

20. The PUF generator of claim 18, wherein the I/O circuit further comprising:
   at least two pass gates, at least one pre-discharge transistor, and at least one equalizer, wherein each of the at least two pass gates comprises a transmission gate, wherein the transmission gate comprise at least 2 transistors, wherein each of the at least one pre-discharge transistor is coupled between a first voltage and at least one respective bit line of the at least two columns, wherein each of the at least one equalizers is coupled between two respective bit lines of the at least two columns.

* * * * *